United States Patent
Tofano

(10) Patent No.: US 8,176,292 B2
(45) Date of Patent: May 8, 2012

(54) CONTROLLING CONFIGURABLE VARIABLE DATA REDUCTION

(76) Inventor: Jeffrey Vincent Tofano, San Jose, CA (US)

( * ) Notice: Subject to any disclaimer, the term of this patent is extended or adjusted under 35 U.S.C. 154(b) by 54 days.

(21) Appl. No.: 12/862,712

(22) Filed: Aug. 24, 2010

(65) Prior Publication Data

US 2011/0225385 A1    Sep. 15, 2011

(30) Foreign Application Priority Data

Mar. 9, 2010   (GB) ..................... 1003914

(51) Int. Cl.
    *G06F 12/00*   (2006.01)
(52) U.S. Cl. ........................ 711/170; 711/206
(58) Field of Classification Search .......... 711/170, 711/206
    See application file for complete search history.

(56) References Cited

U.S. PATENT DOCUMENTS

| 5,966,138    | A  | * | 10/1999 | Tanaka      | 345/658 |
| 2003/0110296 | A1 | * | 6/2003  | Kirsch et al. | 709/246 |
| 2005/0262167 | A1 |   | 11/2005 | Teodosiu et al. | 707/204 |
| 2009/0313248 | A1 |   | 12/2009 | Balachandran et al. | 707/6 |
| 2010/0088296 | A1 | * | 4/2010  | Periyagaram et al. | 707/705 |

FOREIGN PATENT DOCUMENTS

| EP | 2015184       | 1/2009  |
| WO | WO96/25801    | 8/1996  |
| WO | WO2008/008183 | 1/2008  |
| WO | WO2009/129160 | 10/2009 |
| WO | WO2010/040078 | 4/2010  |

* cited by examiner

*Primary Examiner* — Hashem Farrokh
(74) *Attorney, Agent, or Firm* — J T Kalnay

(57) ABSTRACT

Example apparatus, methods, and computers control configurable, variable data reduction. One example method includes identifying data reduction controlling attributes in an object to be data reduced by a configurable variable data reducer. The attributes provide information upon which decisions concerning whether and/or how to data reduce the object can be based. The example method also includes controlling a configurable variable data reducer to selectively data reduce the object based, at least in part, on the data reduction controlling attributes. The control exercised can determine whether, where, when, and/or how data reduction will proceed.

3 Claims, 4 Drawing Sheets

US 8,176,292 B2

CONTROLLING CONFIGURABLE VARIABLE DATA REDUCTION

CROSS-REFERENCE TO RELATED APPLICATIONS

This application claims priority to United Kingdom Patent Application No. 1003914.7 filed on Mar. 9, 2010, the disclosure of which is incorporated herein by reference in its entirety.

BACKGROUND

Data can be stored and data can be transmitted. Storing data takes time and space while transmitting data takes time and bandwidth. Both storing and transmitting data cost money. Yet more and more data is being generated every day. Indeed, the rate at which the amount of data is expanding may be exceeding the rate at which storage space and transmission bandwidth are growing. Furthermore, while the amount of data to be stored and/or transmitted is growing, the amount of time available to store and/or transmit data remains constant. Therefore, efforts have been made to reduce the time, space, and bandwidth required to store and/or transmit data. These efforts are referred to as data reduction. Data reduction includes data deduplication, data protection, and data management. Data deduplication may be referred to as "dedupe".

Data reduction for data storage initially relied on the fact that a larger piece of data can be represented by a smaller fingerprint. The fingerprint can be, for example, a hash. By way of illustration, a 1 K block of data may be uniquely identified by a 128 bit cryptographic hash. Sophisticated techniques for computing hashes have been developed. Data reduction for data storage also relied on the fact that much data that is stored has already been stored. If data has already been stored, then it does not have to be stored again. Instead of storing a copy of a block of data that is already stored, a record that identifies and facilitates locating the previously stored block can be stored. The record can include the fingerprint and other information. Data reduction involves both breaking a larger piece of data into smaller pieces of data, which can be referred to as "chunking", and producing the unique identifier, which can be performed by hashing.

Conventionally, determining whether a chunk of data has already been stored included comparing chunks of data byte-by-byte. After dedupe chunking and hashing has been performed, determining whether a chunk of data has been stored could also include comparing fingerprints (e.g., hashes) instead of comparing chunks of data byte-by-byte. Comparing 128 bit hashes can be more efficient than comparing chunks (e.g., 1k, 128k) of data byte-by-byte. Therefore, data reduction for data storage can involve chunking larger pieces of data into smaller chunks, computing fingerprints (e.g., hashes) for the smaller chunks, and then comparing fingerprints. Comparing fingerprints can involve indexing the fingerprints to facilitate their retrieval and searching. However, indexing should not consume so much additional memory that an inordinate amount of the space saved through data reduction is spent on indexing.

Data reduction for data transmission also initially relied on the fact that a large piece of data that can be represented by its smaller fingerprint can, in effect, be transmitted by transmitting the fingerprint to a system that already has the large piece of data and an indexed fingerprint for the large piece of data. Data reduction for data transmission also relied on the fact that much data that is transmitted has already been transmitted. Once again, representing a large piece of data using a fingerprint, and determining whether a certain fingerprint has been seen before both involve chunking and fingerprinting (a.k.a. chunking and hashing), and indexing.

Data reduction can include dedupe. Dedupe can be applied to aggregations of data (e.g., files) that can be partitioned into smaller parts (e.g., chunks). An aggregation of data can be referred to more generally as an object. Conventional dedupe has included identifying boundaries between chunks of data and computing a hash for the data between the chunk boundaries. Comparing chunk hashes facilitates determining whether a chunk has been previously stored and/or transmitted. If the chunk has already been stored, then there is no need to store it again, there is only a need to record the fact that the chunk is stored and where it is stored. If the chunk has already been transmitted, and if it was stored at the receiving site, then there is no need to transmit the whole chunk again. There is only a need to record the fact that the chunk was stored at the receiving site and where it was stored. Determining whether a chunk has been previously stored and/or transmitted involves comparing fingerprints. Efficiently comparing fingerprints involves efficiently finding fingerprints, which involves prior attention to indexing.

SUMMARY

As a broad summary, this writing discusses the following: Example apparatus, methods, and computers control configurable, variable data reduction. One example method includes identifying data reduction controlling attributes in an object to be data reduced by a configurable variable data reducer. The attributes provide information upon which decisions concerning whether and/or how to data reduce the object can be based. The example method also includes controlling a configurable variable data reducer to selectively data reduce the object based, at least in part, on the data reduction controlling attributes. The control exercised can determine whether, where, when, and/or how data reduction will proceed.

BRIEF DESCRIPTION OF THE DRAWINGS

The accompanying drawings, which are incorporated in and constitute a part of the specification, illustrate various example methods, apparatuses, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
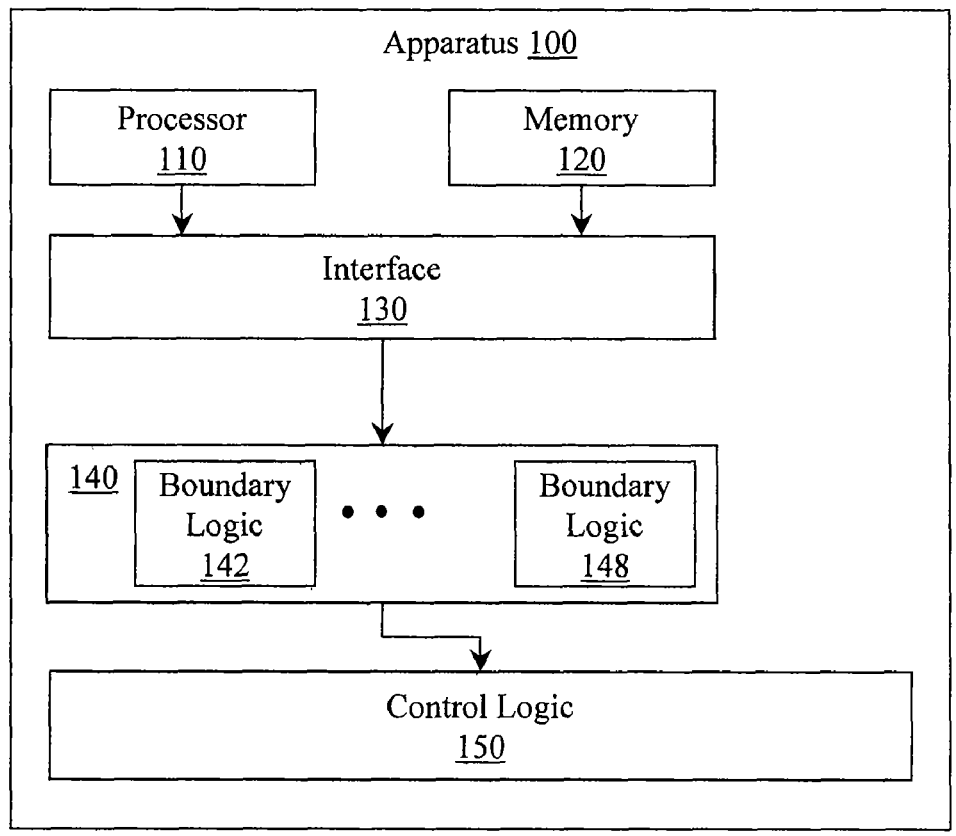
FIG. 1 illustrates an embodiment of an apparatus associated with controlling configurable variable data reduction.

Described herein are techniques for treating objects to be data reduced differently based on attributes of the object, the context of the object, and on a potential data reduction benefit that may be attained by selectively parameterizing existing techniques and/or applying different data reduction techniques to the object. The potential data reduction benefit that may be attained can be evaluated by examining both the contents and/or information about the object to be reduced (e.g., file type, context).

Example systems and methods decide whether an object (e.g., file) should be data reduced before trying to reduce it. Some types of data have no repetitiveness or duplication of data. Identifying these types of files facilitates not wasting resources on dedupe. Some files may be unique files that store certain types of information or that store information in a way that is known to not benefit from data reduction. Example apparatus and methods may decide to not present these types of objects to a data reducer to reduce time wasted in fruitless dedupe.

Example systems and methods may also decide whether an object should be data reduced using a variety of techniques including, but not limited to, a compression technique (e.g., run length encoding), using single instance processing (e.g., when a duplicate file is encountered), using a fixed block length data deduplication technique, using a variable length data deduplication technique, or using other techniques.

If an object is to be data reduced using chunking and hashing, example systems and methods may decide how to place boundaries. Initially, boundaries may have been placed according to a fixed chunk size, a variable chunk size, a variable chunk size as determined by a data dependency constraint, and other techniques. These constraints and techniques may have operated under the assumption that nothing was known about the data to be deduped. However, over time, much has been learned about data and data aggregations (e.g., files, objects) and this knowledge facilitates determining more intelligent and more efficient ways to place boundaries. For example, many data structures store entries that are zero padded or padded in other known ways. Therefore, to facilitate producing chunks that correspond to padded data structure entries, padding may be looked for. A run of zeroes may indicate a useful location to place a boundary. In another example, many data structures and file formats (e.g., XML (extensible markup language)) include delimiters that identify the start and/or end of an entry. Therefore, to facilitate producing chunks that correspond to delimited entries, delimiters may be looked for. A delimiter may indicate a useful location to place a boundary. In yet another example, knowledge about a data aggregation (e.g., file type, file size, file format) may provide clues for useful placement of a boundary. If no useful locations are found using these techniques, then a default fall-back technique can include a conventional technique (e.g., pattern matching rolling hash). One skilled in the art will appreciate that the boundary placement techniques can be applied in different orders.

A conventional way to place a boundary relies on determining a boundary location based on a pattern matching approach. When a pattern is seen in the data to be deduped, a boundary for the start of the chunk is placed. When another pattern is seen, then a boundary for the end of the chunk is placed. Depending on when, if ever, a chunk-ending pattern is seen, then a minimum and/or maximum chunk size limit may be relied upon to place the chunk-ending boundary. Conventionally, even though the pattern may have been data-dependent, the pattern matching was still data agnostic. While this agnosticism provided for a general solution, the general solution may have suffered from avoidable inefficiencies. For example, for a file that is known to include a collection of zero padded records, it makes more sense to place boundaries using the relatively simple task of identifying the end of a zero pad sequence rather than placing boundaries using the general approach. Similarly, if a file is known to be a collection of delimited records, then it makes more sense to place boundaries using the relatively simple task of identifying the delimited start and end of a record rather than placing boundaries using the general approach.

If a first actor chunks and hashes in a first way, then a second actor that wants to interact with the chunks and hashes will perform better by knowing how the chunks and hashes were produced and how to evaluate and/or produce similar chunks and hashes. Using consistent approaches facilitates having multiple actors participate in and benefit from data reduction. However, different apparatuses, systems, and computers may employ individual dedupe approaches. When these different entities want to co-operate, the different entities may seek to find common dedupe approaches for which both entities are configured. Common dedupe approaches may include actions like chunking data similarly and hashing data similarly. Data may be chunked using criteria including runs, delimiters, rules, and data dependent patterns. Data may be chunked into fixed sized chunks and/or into variable sized chunks. Thus, co-operating processes may share information about chunking approaches to facilitate interactions. If co-operating processes do not place chunk boundaries at the same locations, then it will be practically impossible to reduce data by chunking and hashing.

Examining common data storage situations provides insight into dedupe and how configurable variable data reduction can enhance conventional dedupe. One classic wasteful data storage situation involves storing two identical copies of a file. The single-instance approach to data reduction has demonstrated significant storage savings by preventing the storage of duplicate copies of files. When a single-instance approach yields an acceptable or optimal result, configurable variable data reduction will simply take the single-instance approach rather than blindly performing an unnecessary and ill-advised chunking and hashing technique.

Another classic wasteful data storage situation involves storing an original word processor file and storing an edited copy of the file that has exactly one edit. Consider a 100 k word processor file that was missing a period at the end of a sentence and that was edited to then include the period. A conventional system may store both the original 100 k file and the edited 100 k file because a single instance approach would not work. A dedupe system would likely be able to break the 100 k file into smaller chunks and store duplicate chunks once while storing two versions of the edited chunk. Data stored for the second "file" may include the fingerprints of the duplicate chunks rather than the actual data. Data stored for the second file may also include the chunk that is different. In addition to storing the chunks, the fingerprints for the chunks may be stored. How the fingerprints are stored, including how the fingerprints are indexed, affects how efficiently the fingerprints can be found and thus how efficiently a later decision concerning whether a chunk has already been stored can be made.

Another classic wasteful data storage situation involves an email that has been forwarded fifty times where the only difference between the fifty forwarded versions is the address line where an address was added on each forward. If the body of the email can be chunked and hashed or processed using a single instance technique, then only one copy of the body needs to be stored. Other "copies" of the email can be represented by the fingerprint of the body or the single instance information and the different address lines. Configurable variable data reduction facilitates determining an appropriate data reduction method and/or set of methods for achieving a desired data reduction result.

Another classic wasteful data storage situation involves a photograph that has had a small region edited. Consider an original photograph and an edited copy of the photograph that has had the "red-eye" removed from a person in the photograph. Conventionally, two separate copies would be stored. Dedupe facilitates chunking and hashing portions of the photograph, storing the data for a chunk once, and then storing the fingerprint for the data for other "copies" of chunks the photograph. However, a photograph may include long runs of identical data that historically have not deduped well. Therefore, a run-length encoding may yield superior data reduction over chunking and hashing for at least portions of the photograph. Thus, the "file" that is stored for a copy of a photograph by a variable configurable data reducer may include some encoded run information and some chunk and hash information.

Another classic wasteful data storage situation involves a file that includes embedded objects. For example, a word processor file may include embedded slides, embedded images, and other embedded items. While the text of the word processor file may be suitable for chunking and hashing, some of the embedded items (e.g., photographs) may be more suitable for single instance processing while other embedded items (e.g., XML code) may be more suitable for delimiter based chunking and hashing. Thus, the "file" stored in this type of situation by a configurable variable data reducer may include several types of information: chunk and hash information for the word processor text, single instance information for the embedded photographs, and delimiter based chunk and hash information for the embedded XML code.

Having reviewed data reduction, dedupe, and how configurable variable data reduction can be applied to classic wasteful data storage situations, this application now describes in greater detail apparatus, methods, and other embodiments associated with controlling configurable variable data reduction.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

FIG. 1 illustrates apparatus 100. Apparatus 100 is configured to control configurable variable data reduction. Apparatus 100 includes a processor 110, a memory 120, and an interface 130. Interface 130 connects the processor 110, the memory 120, and a set 140 of logics (e.g., 142, . . . 148). In different embodiments, the logics may be, for example, circuits, integrated circuits, application specific integrated circuits (ASICs), and other entities. Apparatus 100 also includes a control logic 150. Apparatus 100 can be configured to control when (e.g., in-line, post-processing) data reduction is to occur, where (e.g., locally, remote) data reduction is to occur, how (e.g., distributed, monolithic) data reduction is to occur, techniques (e.g., chunking and hashing, single instance processing, run length encoding) to be used for data reduction, and other facets of configurable variable data reduction.

In one embodiment, the set 140 of logics includes at least two boundary logics (e.g., 142, 148). The set 140 of logics determine a set of chunk boundaries for controlling chunking and hashing. The boundaries are selected as a function of an attribute of an object to be data reduced. The attribute can be, for example, an object size, an object type, an object format, an object organization, an object entropy, an object context, and a data reduction control field associated with the object. By way of illustration, object size can determine whether a large fixed block size chunk and hashing method will be attempted or whether a smaller variable block size chunk and hashing method will be attempted. By way of further illustration, object type and format can determine whether a delimiter based chunk boundary method will be attempted. By way of still further illustration, an object entropy can determine whether data reduction through data deduplication is even to be attempted. For example, compression may be more appropriate for a file with extremely low entropy while chunking and hashing may be more appropriate for a file with a mid-range entropy.

Entropy is a measure of uncertainty associated with the randomness of data in an object to be data reduced. The entropy of data that is truly random is one. The entropy of a long string of duplicate characters is nearly zero. The entropy of most data falls between these two limiting examples. Apparatus 100 can control a data reduction process to selectively perform data reduction using different approaches based on the entropy of an object. Therefore, the entropy for an object to be data reduced can be measured and a determination can be made about whether and how to control the data reduction process based on the entropy. By way of illustration, a file that contains English text will likely have an entropy measurement that will lead apparatus 100 to control a configurable variable data reducer to perform chunking and hashing data reduction using data dependencies for boundary placement. However, a file that contains a photograph may have an entropy that leads to a different data reduction technique.

One example boundary logic is a run boundary logic. A run boundary logic can be configured to identify a set of run based chunk boundaries for an object to be data reduced. The run boundary logic can add the set of run based chunk boundaries to a set of chunk boundaries for later use by a configurable variable data reducer. In one example the run boundary logic can be configured to identify a run based chunk boundary in response to identifying a set of repeating characters. The size of the set of repeating characters can be configured so that it must include at a least a threshold number of repeating characters before a run based boundary is placed. In one example, the run boundary logic is configured to create a run based chunk boundary at the end of the set of repeating characters.

Since the apparatus 100 controls a configurable variable data reducer, in one example the run boundary logic is configured to either run length encode members of the set of repeating characters and/or to control the data reducer to run length encode members of the set of repeating characters. Therefore the run boundary logic can lead apparatus 100 to control the data reducer to not reduce data that has been run length encoded and can control the data reducer to reduce data that has been chunked and for which run based boundaries have been produced. Rather than only have one way to treat data, and to have the data treated as though nothing was known about it, the apparatus 100 can treat data differently based on information concerning the data.

Another example boundary logic is a delimiter boundary logic. Delimiters are used to separate things. One skilled in the art will recognize that delimiters appear in files like XML (extensible markup language) files, HTML (hypertext markup language) files, tab-delimited fields, spreadsheets, and other files. A delimiter boundary logic can be configured to identify a set of delimiter based chunk boundaries for an object to be data reduced. Chunking an object into entries that are bounded by delimiters facilitates hashing portions of data that can change (e.g., record contents) while not hashing portions of data that do not change (e.g., delimiters). Chunking an object into entries that are bounded by delimiters facilitates reducing data by facilitating identifying duplicates at the record or field level. The delimiter based chunk boundary logic can add the set of delimiter based chunk boundaries to the set of chunk boundaries for later use by a configurable variable data reducer. In one example, the delimiter boundary logic identifies a delimiter based chunk boundary in response to identifying a delimiter character in the object. The delimiter boundary logic can then create a delimiter based chunk boundary after the delimiter character.

One skilled in the art will appreciate that an object can include portions that are padded and portions that are delimited. Therefore, a configurable variable data reducer can be controlled to perform run based chunking and hashing on one portion of an object and can be controlled to perform delimiter based chunking and hashing on another portion of the object. Conventionally a single approach may have been applied to an entire object.

Another example boundary logic is a rules or filter based boundary logic. A rules based logic is configured to identify a set of rules based chunk boundaries for the object and to add the set of rules based chunk boundaries to the set of chunk boundaries. In one example, a rules based boundary logic identifies a rules based chunk boundary in response to examining the contents of the object and determining that a rule associated with the object has been satisfied. In another example, a rules based boundary logic identifies a rules based chunk boundary in response to examining information about the object (e.g., file type, file format, file context) and determining that a rule associated with the object is in effect. The rule may identify patterns to be matched, conditions to be met, headers and/or footers to be examined, and other attributes that inform boundary placement. By way of illustration, a first file type may have a first type of header that is known to data reduce acceptably when the header is broken into three chunks on known boundaries. Rather than look for padding or delimiters, the chunk boundaries can be simply established by the rules based boundary logic at the known locations. By way of further illustration, a second file type may have a second type of organization that is known to data reduce optimally when broken into fixed sized chunks whose size is determined as a percentage of the overall file size. Rather than look for padding or delimiters, and rather than doing a rolling hash, the rules based filter can determine the file type, recognize that a size based chunk boundary will be appropriate, determine the file size, and then determine the chunk boundaries as a function of the file size. Once again, one skilled in the art will appreciate that an object can have chunk boundaries established by a combination of logics. For example, a file may have rules that facilitate removing certain data from consideration for run or delimiter based chunking. This data may be handled by a rule or filter, and the remaining data can then be processed for run or delimiter based boundaries.

Another example boundary logic is a data dependent boundary logic. A data dependent boundary logic can be configured to identify a set of data dependent chunk boundaries for the object and to add the set of data dependent chunk boundaries to the set of chunk boundaries. One skilled in the art will appreciate that data dependant boundaries can be established separately and/or in conjunction with other boundaries.

The apparatus 100 controls configurable variable data reduction. In one example, the variability can include performing different chunking and hashing. Therefore, in different examples, the set of chunk boundaries produced by the set 140 of boundary logics can include chunk boundaries identified by only one boundary logic. However, in another example, the set of chunk boundaries can include chunk boundaries identified by two or more boundary logics.

Apparatus 100 can be configured to control the minimum and/or maximum chunk size. The control can be achieved by configuring members of the set 140 of boundary logics to satisfy a minimum chunk size and/or a maximum chunk size when producing boundaries.

Control logic 150 operates to control a data reducer to chunk an object based, at least in part, on a set of chunk boundaries. Chunking and hashing can occur at different times in different applications. Therefore, in different embodiments, the control logic 150 can control a configurable variable data reducer to perform data reduction as a backup process, as an archive process, as a nearline process, as a primary process, and as other types of processes performed at different times in different locations and as monolithic and/or distributed processes. Control logic 150 can be configured to perform data reduction in one or more passes. Different passes can perform a greater and/or lesser amount of processing on different portions of an object based on earlier data reduction results. In one example, the control logic 150 can also be configured to perform two or more competing data reductions and selecting a winner.

Archiving typically focuses on preserving documents or data in a form that has some sort of certifiable integrity. Archives are generally immune to unauthorized access and tampering, and can be the subject of record management operations (e.g., automatic deletion after a certain period, auditor-initiated retrieval). Archives are generally conceived to be an operational system for processing documents and/or data that are no longer in active use.

Nearlining concerns holding data that is used less frequently than the most current data but that is used frequently enough that archiving may store the data too deeply. Nearline data is contrasted to online data, which will be the most currently used data. Nearline storage represents a compromise between online storage and offline storage (e.g., archive). Controlling configurable variable data reduction may be based on the destination (e.g., online, nearline, archive) for data.

Figure 2:
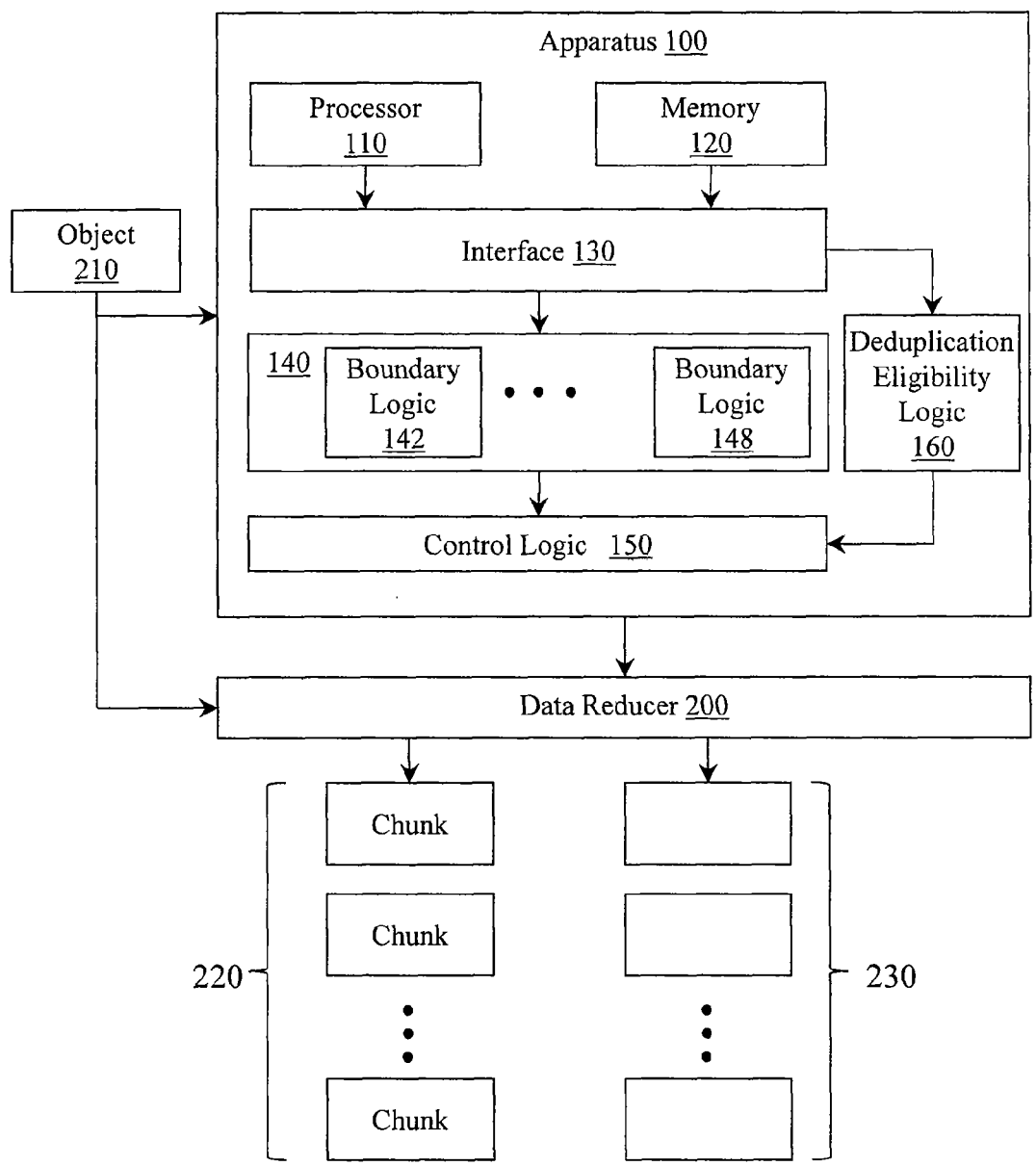
FIG. 2 illustrates an embodiment of an apparatus associated with controlling configurable variable data reduction.

FIG. 2 illustrates another embodiment of apparatus 100. Apparatus 100 is illustrated receiving an object 210 to be reduced by a data reducer 200. Data reducer 200 is a configurable variable data reducer that is controlled by apparatus 100. Apparatus 100 includes a deduplication eligibility logic 160.

In some examples, the control logic 150 may control the configurable variable data reducer 200 to not even attempt data deduplication. In this example, deduplication eligibility logic 160 is configured to determine whether to control the data reducer 200 to data reduce the object 210. If the deduplication eligibility logic 160 determines that the object 210 should be processed by the data reducer 200, then the deduplication eligibility logic 160 may control the data reducer 200 to perform a fixed block length data deduplication, a variable block length data deduplication, a rolling hash based deduplication, a single instance file duplicate data reduction, or other data reduction technique. As described above, the apparatus 100 can control the data reducer 200 to perform the deduplication in different ways at different times in different orders or sequences using different approaches on different machines. For example, based on analyzing a first object, apparatus 100 can control configurable variable data reduction to be performed as a monolithic process on a single processor configured to perform chunking and hashing at post-processing time as part of an archival system. In another example, based on analyzing a second object, apparatus 100 can control configurable variable data reduction to be performed as a distributed process on a cloud of processors that perform chunking and hashing inline as part of a near-lining system. One skilled in the art will appreciate that other combinations are possible.

Apparatus 100 can control the data reducer 200 to perform different techniques on different objects and can control the data reducer 200 to perform different techniques on different parts of an object. For example, a first object may be a candidate for single instance processing and thus apparatus 100 may control data reducer 200 to simply perform the single instance processing. A second object may be a candidate for run based chunk boundary chunking and hashing. Therefore apparatus 100 may control data reducer 200 to chunk and hash the object using run based chunk boundaries computed by the set 140 of boundary logics. However, a third object may be a candidate for a combination of two or more data reduction techniques. For example, the word processing file described above that includes embedded images and embedded XML code may be a candidate for single instance processing of embedded images, delimiter based chunking and hashing of embedded XML code, and data dependent rolling hash based chunking and hashing of the text in the file. Therefore apparatus 100 can control data reducer 200 to perform the three different techniques on the same object. In one example the apparatus 100 can control the order in which the three techniques are applied. The apparatus could also control the configurable variable data reduction to perform the three different techniques substantially in parallel on three different machines. One skilled in the art will appreciate that other combinations are possible.

Data reducer 200 can produce chunks 220 and descriptors 230. The descriptors 230 can include, for example, fingerprints for a chunk and information describing the chunk (e.g., chunk location, chunk boundary technique, chunk hash technique). In one example, descriptor information can be related back to object 210. Therefore, the next time object 210 is presented to an apparatus like apparatus 100 that will control a data reducer 200, the object 210 can bring information about how it was data reduced at an earlier time. Thus, in one example, an apparatus 100 can base a decision about how to control a data reducer 200 on information available in the object 210 to be data reduced.

The following illustrates one example configurable variable data reduction. An object to be data reduced is identified. The object will first be analyzed to determine whether it is a type of object that will or will not benefit from dedupe. If the object will not benefit, then configurable variable data reduction will stop. If the object will benefit then further analysis occurs. The object may be analyzed to determine candidate chunk boundaries using run based chunk boundary processing, delimiter based chunk boundary processing, and rule based chunk boundary processing. The object may also be analyzed to determine candidate minimum and/or maximum chunk sizes. The object may also be analyzed to determine candidate fixed chunk sizes and boundaries and candidate variable chunk sizes and boundaries. The candidate chunk boundaries, chunk sizes, and other candidate computations are then analyzed to determine a potential dedupe benefit. Both the candidates and the candidate computations can be performed individually and/or in parallel. Based on the candidate computations, a determination can be made concerning what type of data reduction will be performed and in what order different reduction techniques will be applied.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic. The physical manipulations transform electronic components and/or data representing physical entities from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 3:
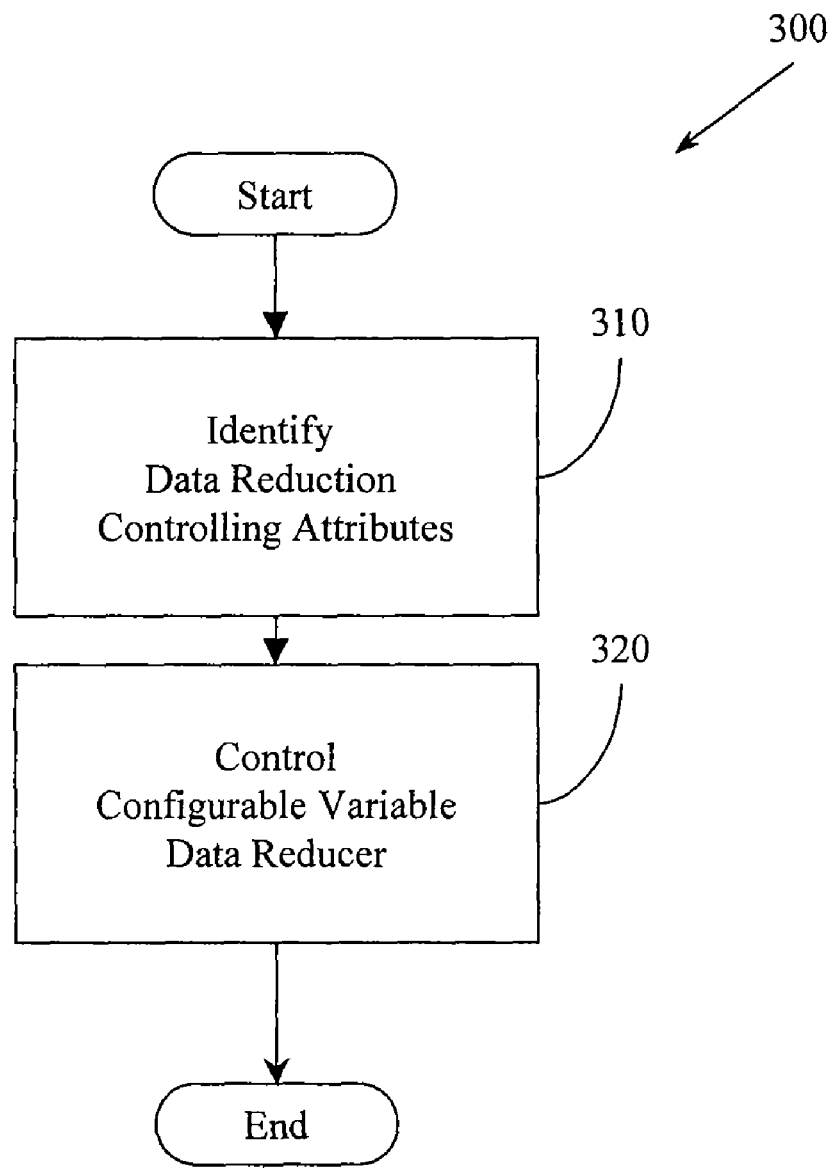
FIG. 3 illustrates an embodiment of a method associated with controlling configurable variable data reduction.

FIG. 3 illustrates a method 300. Method 300 includes, at 310, identifying data reduction controlling attributes in an object to be data reduced by a configurable variable data reducer. In different examples the data reduction controlling attributes can include but are not limited to object size, object type, object format, object organization, object self-describing control information, object context, run-based chunk boundary information, delimiter-based chunk boundary information, filter-based chunk boundary rationale, rolling-hash based chunk boundary rationale, a negotiated variable constraint for placing a chunk boundary, and object entropy.

Method 300 also includes, at 320, controlling the configurable variable data reducer to selectively data reduce the object based, at least in part, on the data reduction controlling attributes. Controlling 320 the reducer to selectively data reduce the object can include controlling the configurable variable data reducer to perform different types of data reduction in different ways using different schemes in different sequences at different locations. Data reduction can include single instance processing, compression, data deduplication, and other techniques. The techniques can be applied singly, in serial, in parallel, and using combinations thereof. The processing can be performed at one time by one process and/or can be performed at different times in different locations by a distributed process. The processing may be performed as part of a primary process, a nearline process, an archival process, and as parts of other processes.

This paragraph describes one example execution of method 300. An object to be data reduced is identified. The object is examined to determine whether it is carrying self-describing data reduction information. If so, then the object may be data reduced according to those instructions. For example, the object may carry rules describing how to place boundaries, how to perform single instance processing on an embedded object, ranges where run length boundary placement is desired, ranges where delimiter based boundary placement is desired, delimiter identifiers, and ranges where variable length data dependent boundary placement is desired. The object may also include data reduction information that indicates that for a certain range the object has no idea how it should be data reduced and that the receiving process or apparatus should go ahead and figure that out. If there is no information about the object, then the method can analyze the object to determine whether and how to proceed. The object may be a type that is unknown to the method and thus rules based processing may terminate. Or the object may be a type that is known and for which the method has rules available. In this case the method may apply the rules to control data reduction. However, the object may neither carry information nor have applicable rules known to the method. In this case the method may evaluate different approaches (e.g., delimiter based chunk boundary placement, run based chunk boundary placement, fixed chunk boundary placement) to determine how to control data reduction. While evaluating different approaches, the method may also consider when the techniques could be applied (e.g., inline, nearline, archival), where the techniques could be applied (e.g., local, remote), and how the techniques could be applied (e.g., monolithically, distributed) before controlling a configurable variable data reducer. The evaluation can produce predicted results and the control exercised can be based on the predicted results. In some cases, a first acceptable result may be used to determine control while in other cases an optimal result may be sought. In different examples, an object may carry different types of information. A first type of information may be characterized as hints that facilitate discerning a set of rules to be applied for de-duplicating information. A second type of information may be characterized as actual rules to be applied for deduping.

In one example, a method may be implemented as computer executable instructions. Thus, in one example, a computer readable medium may store computer executable instructions that if executed by a computer (e.g., data reduction server) cause the computer to perform method 300. While executable instructions associated with the above method are described as being stored on a computer readable medium, it is to be appreciated that executable instructions associated with other example methods described herein may also be stored on a computer readable medium.

"Computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an ASIC, a CD (compact disk), other optical medium, a RAM (random access memory), a ROM (read only memory), a memory chip or card, a memory stick, and other media from which a computer, a processor, or other electronic device can read.

Figure 4:
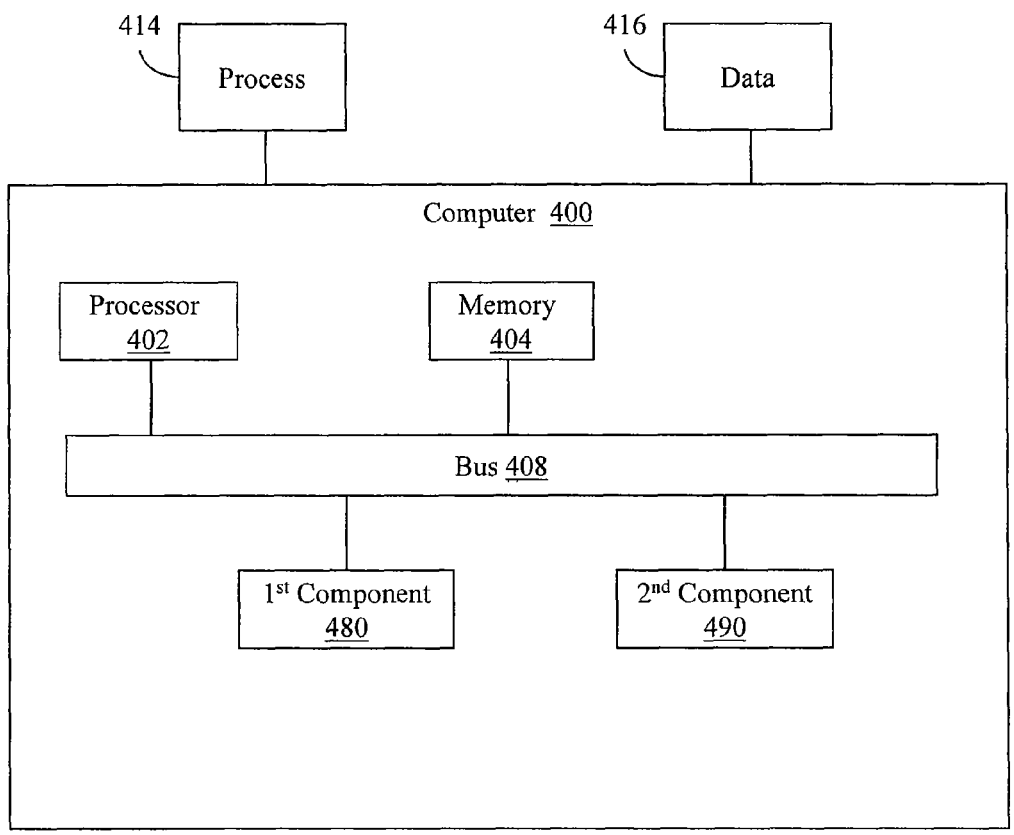
FIG. 4 illustrates an embodiment of a computer configured to control configurable variable data reduction.

FIG. 4 illustrates a computer 400. Computer 400 includes a processor 402 and a memory 404 that are operably connected by a bus 408. In one example, the computer 400 may include a first component 480 that is configured to produce a set of predicted data reduction results for an object to be data reduced. A predicted data reduction result is computed as a function of analyzing a data reduction technique to be applied to an object in light of a measurable attribute of the object. The computer 400 can include a second component 490 that is configured to control data reduction of the object as a function of the set of predicted data reduction results.

Generally describing an example configuration of the computer 400, the processor 402 may be a variety of various processors including dual microprocessor and other multiprocessor architectures. A memory 404 may include volatile memory (e.g., RAM (random access memory)) and/or non-volatile memory (e.g., ROM (read only memory)). The memory 404 can store a process 414 and/or a data 416, for example. The process 414 may be a data reduction process and the data 416 may be an object to be data reduced.

The bus 408 may be a single internal bus interconnect architecture and/or other bus or mesh architectures. While a single bus is illustrated, it is to be appreciated that the computer 400 may communicate with various devices, logics, and peripherals using other busses (e.g., PCIE (peripheral component interconnect express), 1394, USB (universal serial bus), Ethernet). The bus 408 can be types including, for example, a memory bus, a memory controller, a peripheral bus, an external bus, a crossbar switch, and/or a local bus.

While example apparatus, methods, and articles of manufacture have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims. All elements and steps described in this writing are preferably included but are not required to be included.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Concepts

As short summaries, this writing has disclosed at least the following broad concepts.

Concept 1. An apparatus, comprising:
  a processor;
  a memory; and
  an interface to connect the processor, memory, and a set of logics, the set of logics comprising:
  two or more boundary logics configured to determine a set of chunk boundaries for an object to be data reduced by a data reducer; and
  a control logic to control the data reducer to chunk the object based, at least in part, on the set of chunk boundaries.

Concept 2. The apparatus of concept 1, where the two or more boundary logics determine the set of chunk boundaries based, at least in part, on an attribute of the object.

Concept 3. The apparatus of concept 2, the attribute comprising one or more of, an object size, an object type, an object format, an object organization, an object entropy, an object context, and a data reduction control field associated with the object.

Concept 4. The apparatus of concept 1, the two or more boundary logics comprising two or more of:

a run boundary logic configured to identify a set of run based chunk boundaries for the object and to add the set of run based chunk boundaries to the set of chunk boundaries;

a delimiter boundary logic configured to identify a set of delimiter based chunk boundaries for the object and to add the set of delimiter based chunk boundaries to the set of chunk boundaries;

a rules based boundary logic configured to identify a set of rules based chunk boundaries for the object and to add the set of rules based chunk boundaries to the set of chunk boundaries; and a data dependent boundary logic configured to identify a set of data dependent chunk boundaries for the object and to add the set of data dependent chunk boundaries to the set of chunk boundaries.

Concept 5. The apparatus of concept 4, where the run boundary logic is configured to identify a run based chunk boundary in response to identifying a set of repeating characters, where the set of repeating characters includes at least a threshold number of repeating characters.

Concept 6. The apparatus of concept 5, where the run boundary logic is configured to create a run based chunk boundary at the end of the set of repeating characters.

Concept 7. The apparatus of concept 5, where the run boundary logic is configured to perform one or more of, run length encoding of members of the set of repeating characters, and controlling the data reducer to run length encode members of the set of repeating characters.

Concept 8. The apparatus of concept 4, where the delimiter boundary logic is configured to identify a delimiter based chunk boundary in response to identifying a delimiter character in the object.

Concept 9. The apparatus of concept 8, where the delimiter boundary logic is configured to create a delimiter based chunk boundary after the delimiter character.

Concept 10. The apparatus of concept 4, where the rules based boundary logic is configured to identify a rules based chunk boundary in response to examining the contents of the object and determining that a rule associated with the object has been satisfied.

Concept 11. The apparatus of concept 1, where the set of chunk boundaries contains one or more of, chunk boundaries identified by only one boundary logic and chunk boundaries identified by two or more boundary logics.

Concept 12. The apparatus of concept 1, where the two or more boundary logics are constrained to place boundaries in locations that satisfy one or more of, a minimum chunk size, and a maximum chunk size.

Concept 13. The apparatus of concept 1, where the control logic is configured to control the data reducer to perform data reduction on the object as one or more of, a backup process, an archive process, a nearline process, and a primary process.

Concept 14. The apparatus of concept 1, where the control logic is configured to control the data reducer to perform the data reduction as one or more of, a monolithic process, a distributed process, a local process, a remote process, an in-line process, a post-processing process, a single pass, and multiple passes.

Concept 15. The apparatus of concept 1, where the control logic is configured to control the data reducer to perform one or more of, a fixed block length data deduplication, a variable block length data deduplication, a rolling hash based deduplication, and a single instance file duplicate data reduction.

Concept 16. The apparatus of concept 1, comprising a deduplication eligibility logic configured to determine whether to control the data reducer to data reduce the object.

Concept 17. A computer readable medium storing computer executable instructions that when executed by a computer control the computer to perform a method, the method comprising:

identifying data reduction controlling attributes in an object to be data reduced by a configurable variable data reducer; and controlling the configurable variable data reducer to selectively data reduce the object based, at least in part, on the data reduction controlling attributes.

Concept 18. The computer readable medium of concept 17, where the data reduction controlling attributes include one or more of, object size, object type, object format, object organization, object self-describing control information, object context, run-based chunk boundary information, delimiter-based chunk boundary information, filter-based chunk boundary rationale, rolling-hash based chunk boundary rationale, a negotiated variable constraint for placing a chunk boundary, and object entropy.

Concept 19. The computer readable medium of concept 17, where controlling the configurable variable data reducer to selectively data reduce the object comprises one or more of:

controlling the configurable variable data reducer to selectively perform one or more of, single instance processing, run length encoding, fixed block length data deduplication, variable block length data deduplication, and content based chunking;

controlling the configurable variable data reducer to selectively parameterize one or more of, a single instance processing process, a run length encoding process, a fixed block length data deduplication process, a variable block length data deduplication, and a content based chunking;

controlling the configurable variable data reducer to perform data reduction as one or more of, a primary process, a nearline process, and an archival process;

controlling the configurable variable data reducer to perform two or more instances of data reduction on the object;

controlling the configurable variable data reducer to perform data reduction as one of a monolithic process and a distributed process; and controlling the configurable variable data reducer to perform data reduction as one of, a local process and a remote process.

Concept 20. A computer, comprising:

a first component configured to produce a set of predicted data reduction results for an object to be data reduced, where a predicted data reduction result is a function of a data reduction technique to be applied based on an attribute of the object; and a second component configured to control data reduction of the object as a function of the set of predicted data reduction results.

What is claimed is:

1. An apparatus, comprising: a processor;
a memory; and
an interface to connect the processor, memory, and a set of logics, the set of logics comprising:
two or more boundary logics configured to determine a set of chunk boundaries for an object to be data reduced by a data reducer; and a control logic to control the data reducer to chunk the object based, at least in part, on the set of chunk boundaries the two or more boundary logics comprising two or more of:

a run boundary logic configured to identify a set of run based chunk boundaries for the object and to add the set of run based chunk boundaries to the set of chunk boundaries;

a delimiter boundary logic configured to identify a set of delimiter based chunk boundaries for the object and to add the set of delimiter based chunk boundaries to the set of chunk boundaries;

a rules based boundary logic configured to identify a set of rules based chunk boundaries for the object and to add the set of rules based chunk boundaries to the set of chunk boundaries; and a data dependent boundary logic configured to identify a set of data dependent chunk boundaries for the object and to add the set of data dependent chunk boundaries to the set of chunk boundaries where the run boundary logic is configured to identify a run based chunk boundary in response to identifying a set of repeating characters, where the set of repeating characters includes at a least a threshold number of repeating characters; wherein the run boundary logic is configured to perform one or more of, run length encoding of members of the set of repeating characters, and controlling the data reducer to fun length encode members of the set of repeating characters.

2. An apparatus, comprising: a processor;
a memory; and
an interface to connect the processor, memory, and a set of logics, the set of logics comprising:

two or more boundary logics configured to determine a set of chunk boundaries for an object to be data reduced by a data reducer; and a control logic to control the data reducer to chunk the object based, at least in part, on the set of chunk boundaries the two or more boundary logics comprising two or more of:

a run boundary logic configured to identify a set of run based chunk boundaries for the object and to add the set of run based chunk boundaries to the set of chunk boundaries;

a delimiter boundary logic configured to identify a set of delimiter based chunk boundaries for the object and to add the set of delimiter based chunk boundaries to the set of chunk boundaries;

a rules based boundary logic configured to identify a set of rules based chunk boundaries for the object and to add the set of rules based chunk boundaries to the set of chunk boundaries; and a data dependent boundary logic configured to identify a set of data dependent chunk boundaries for the object and to add the set of data dependent chunk boundaries to the set of chunk boundaries; wherein the delimiter boundary logic is configured to identify a delimiter based chunk boundary in response to identifying a delimiter character in the object.

3. The apparatus of claim 2, where the delimiter boundary logic is configured to create a delimiter based chunk boundary after the delimiter character.

* * * * *